United States Patent [19]

Sánchez Giraldez

[11] Patent Number: 4,544,282
[45] Date of Patent: Oct. 1, 1985

[54] PENDULUM MEANS

[76] Inventor: José H. Sánchez Giraldez, Am Rathenaupark 3, D-2000 Hamburg 50, Fed. Rep. of Germany

[21] Appl. No.: 650,607

[22] PCT Filed: Jan. 16, 1984

[86] PCT No.: PCT/DE84/00012
§ 371 Date: Sep. 14, 1984
§ 102(e) Date: Sep. 14, 1984

[87] PCT Pub. No.: WO84/02811
PCT Pub. Date: Jul. 19, 1984

[30] Foreign Application Priority Data

Jan. 15, 1983 [DE] Fed. Rep. of Germany ....... 3301222

[51] Int. Cl.⁴ .............................................. G04B 17/02
[52] U.S. Cl. .................... 368/179; 368/165; 446/133; 40/426; 273/1 M
[58] Field of Search ...................... 368/179, 165, 166; 40/426; 446/133; 273/1 M

[56] References Cited

U.S. PATENT DOCUMENTS

| 3,908,307 | 9/1975 | Jocobson | 40/426 |
| 4,011,674 | 3/1977 | Jocobson | 40/426 |
| 4,250,657 | 2/1981 | Ishiguro | 273/1 M |
| 4,421,421 | 12/1983 | Bradt | 368/179 |
| 4,437,262 | 3/1984 | Kaga | 40/426 |

Primary Examiner—Bernard Roskoski
Attorney, Agent, or Firm—Beveridge, De Grandi & Weilacher

[57] ABSTRACT

The invention relates to a pendulum means with a symmetrical post carrying two fixed magnets, each of which faces a movable magnet. The two movable magnets are coupled together by a rocker, so that alternately one assumes the minimum distance and the other the maximum distance with respect to the facing fixed magnet. A diaphragm movable at right angles to the magnetic field is associated with the pair of magnets, so that it alternately blocks one field and frees the other.

The rocker and linkage systems carrying the magnets and the locking device are coupled together by a weight, e.g. a ball movable downwards along the sloping surface of a rocker.

3 Claims, 1 Drawing Figure

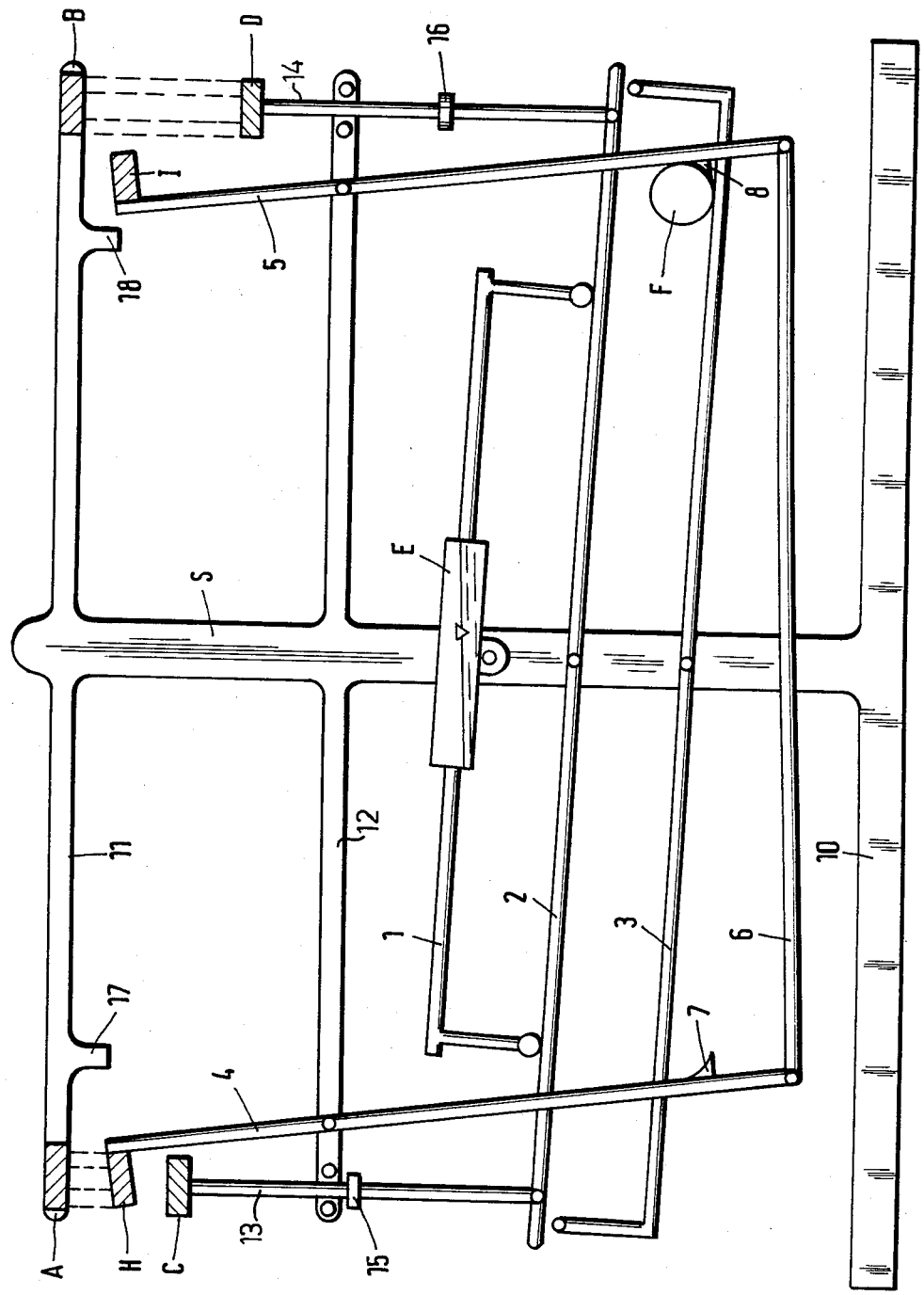

PENDULUM MEANS

FIELD OF USE

The pendulum means according to the invention can be used wherever an initial energy supplied at the start of operation or an operating section is to be distributed over a maximum number of successive working strokes, which does not exclude a new impulse of force being supplied before the complete consumption of the energy quantity. A pendulum means according to the invention can be used as a toy (mobile) or for example as an eye-catcher in display windows. Other possible uses are as a balance for clocks, or as a prime mover.

PRIOR ART

It is assumed that pendulum means with a post or column on which more than one rocker or see-saw is mounted are known. In the case of such known pendulum means, initially a relatively small energy quantity is supplied and this is rapidly consumed after a few strokes of the rocker or rockers.

PROBLEM, SOLUTION, ADVANTAGES

The problem of the invention is to so construct a pendulum means of the aforementioned type through the use of the possibilities of an alternating energy exchange between stores or accumulators of different energy types, that the energy quantity used for starting up the operation of the means is maintained to the maximum possible extent. This is more particularly to be permitted by a cyclically succeeding exchange between magnetic energy, potential mechanical energy and kinetic energy.

According to the invention, this problem is solved in that, on either side of its axis of symmetry, the symmetrical post carries a fixed magnet, each of which is faced by a movable magnet in such a way that the magnetic field distance between the two pairs of magnets varies and can be reduced to a minimum amount; that the two movable magnets are so coupled together by a rocker and a linkage connected in articulated manner thereto that alternately in each case one movable magnet assumes the minimum spacing and the other the maximum spacing from the fixed magnet associated therewith; that a magnetic diaphragm movable at right angles to the magnetic field in the area of the minimum spacing is associated with each pair of magnets; that the two magnetic diaphragms are so coupled together by rockers mounted on the post and a control linkage, that alternately one diaphragm passes in blocking manner into the magnetic field of one pair of magnets and the other diaphragm releases the magnetic field between the other pair of magnets and that the rockers and linkage systems associated with the movable magnets and the magnetic diaphragms are coupled together by a weight moving downwards on the particular sloping surface of a rocker and which strikes against the other rocker and linkage system on abutting against a stop.

Due to the interchange of different energy types in such a means, it is ensured that a relatively large energy quantity is maintained in an almost unreduced form over a long-lasting sequence of pendulum strokes and that this sequence can, if necessary, be supplemented or extended by additional pulses compensating any reduction in the energy quantity which has occurred.

DEVELOPMENT OF THE INVENTION

The movable weight serving as the coupling means for the rocker and linkage systems and which moves downwards on the sloping surface of a rocker and serves to strike against the other rocker and linkage system can be a ball. However, It can also be a block-like, linearly moving body, which slides downwards on the sloping surface of the associated rocker. The linearly moving block-like body can also be guided on easily movable rollers along the rocker associated therewith.

A further possibility is offered by the fact that the linearly movable body is made from magnetic material and its path is surrounded by a wire coil in which, during its movement, it brings about an electric pulse, whose electric energy is intermittently supplied to the pendulum means with the rhythm of its movements or can be used in some other way.

Further possibilities for the advantageous further developments of the invention are described hereinafter relative to the embodiment shown in the drawing.

The means shown in the form of an embodiment has a post S with a base plate 10 and cross-beams 11, 12. Several rockers 1, 2, 3, 4, 5 are mounted in easy-action pivot bearings on post S. Rockers 1, 2, 3 are so coupled together by rods fixed thereto and on whose ends are located rollers, that they perform synchronous or almost synchronous rocker movements. Rockers 4, 5 are connected by means of a rod 6 engaging on in each case one of their ends by means of a joint.

Cross-beam 11 of post S carries a fixed magnet A, B at each of its ends. Opposite to said magnets are provided on the ends of a hinge rod 13, 14 coupled to rocker 2, a magnet C, D movable in linear or approximately linear manner in the direction of or away from one of the fixed magnets A,B. Each of the rods 13, 14 is linearly or approximately linearly guided in an opening at the ends of the cross-beam 12 and the movements thereof with respect to the counter-magnets is limited by a stop 15 or 16. Of the magnets of each pair of magnets A, C or B, D, only one, e.g. here the fixed magnet A, B need be an active magnet, i.e. a permanent magnet or electromagnet, whilst the counter-magnet C or D can be a soft iron body. However, a roller exchange can also take place, in such a way that the lower magnet is an active magnet and the upper magnet a soft iron body.

At the end of rockers 4, 5 opposite to the fulcrum of rod 6 is provided a magnetic diaphragm H, I, which can be made from soft iron and either blocks the magnetic field indicated by dotted lines and as shown to the left of the drawing, or frees it in the manner shown to the right of the drawing. A stop 17 or 18 on cross-beam 11 serves to limit the release movement of rockers 4, 5 with magnetic diaphragms H, I.

A movable weight F, in the form of a ball or roller here, can be guided as a roller path on one of the rockers 1, 2 or 3, in this case 3, so that it can move downwards on the sloping surface of the rocker until it strikes against stop 7 or 8 on one of the rockers 4, 5 and moves the rocker and linkage system 4, 5, 6 into its opposite end position.

A container E for a liquid moving in accordance with the rocker movement, can be connected to a rocker, in this case rocker 1, mounted on post S. Through more or less liquid being introduced into container E, the forces acting on the pendulum means and their interaction can be influenced in the manner which is most favourable for the desired operation.

The weight movably guided along a rocker can also be in the form of a block-like body, e.g. a sliding body moving linearly along the rocker, instead of a ball or roller F, as provided in the embodiment shown in the drawing. Such a linearly moving block-like body can also be guided on easily movable rollers along the rocker associated therewith.

A further possible development of the means comprises such a linearly movable body being made from magnetic material and its roller path being surrounded by a wire coil, in which it causes an electrical pulse during its movement. The thus obtained electrical energy can be converted in per se known manner into mechanical energy and this can be supplied intermittently to the pendulum means with the rhythm of its movements, or can be used in some other way.

A possible use of a pendulum means according to the invention is as a toy (mobile) or e.g. as an eye-catcher in display windows. Another possible use is as a balance for clocks. With respect to the arrangement and construction of the post, the magnets and the rocker and linkage systems, together with the possible uses, there are other possibilities of modification differing from the embodiments represented and description, particularly as a prime mover.

One possibility for further improving a means according to the invention is to arrange a locking device for the particular rocker half on either side of the rocker forming the guideway for the movable weight. This locking devices secures the associated rocker end in its lowest position until when the movable weight strikes the in each case lowest point, it is released from its guideway and frees the movement of the rocker in the opposite direction. The active magnet, which moves the rocker into its end position in which it is locked, consequently need not be permanently stressed. It is sufficient if it exerts a short impulse of force on the rocker. This is particularly important if the active magnet is an electromagnet, whose excitation period can then be shortened by earlier switch-off.

I claim:

1. Pendulum means with a post on which more than one rocker is mounted, characterized in that on either side of its axis of symmetry, the symmetrical post (S) carries a fixed magnet (A, B), each of which is faced by a movable magnet (C, D) in such a way that the magnetic field distance between the two pairs of magnets (A, B; B, D) varies and can be reduced to a minimum amount; that the two movable magnets (C, D) are so coupled together by a rocker (2) and a linkage connected in articulated manner thereto that alternately in each case one movable magnet (C) assumes the minimum spacing and the other (D) the maximum spacing from the fixed magnet associated therewith; that a magnetic diaphragm (H, I) movable at right angles to the magnetic field in the area of the minimum spacing is associated with each pair of magnets (A, C; B, D); that the two magnetic diaphragms (H, I) are so coupled together by rockers (4, 5) mounted on the post and a control linkage (6), that alternately one diaphragm (H) passes in blocking manner into the magnetic field of one pair of magnets (A, C) and the other diaphragm (I) releases the magnetic field between the other pair of magnets (B, D) and that the rockers and linkage systems associated with the movable magnets (C, D) and the magnetic diaphragms (H, I) are coupled together by a weight (F) moving downwards on the particular sloping surface of a rocker and which strikes against the other rocker and linkage system on abutting against a stop (7 or 8).

2. Means according to claim 1, characterized in that the weight is a ball (F).

3. Means according to claim 1, characterized in that a container (E) for a liquid moving in accordance with the rocker movement is connected with a rocker (1) mounted on post (S).

* * * * *